(12) United States Patent
Krummey et al.

(10) Patent No.: US 11,740,671 B1
(45) Date of Patent: Aug. 29, 2023

(54) METHOD, SYSTEM AND APPARATUS FOR MONITORING AND MEASURING POWER USAGE BY A DEVICE

(71) Applicant: Best Energy Reduction Technologies, LLC, King Of Prussia, PA (US)

(72) Inventors: Michael Krummey, Harrison City, PA (US); Scott J. Yetter, Philadelphia, PA (US)

(73) Assignee: Best Energy Reduction Technologies, LLC, King Of Prussia, PA (US)

( * ) Notice: Subject to any disclaimer, the term of this patent is extended or adjusted under 35 U.S.C. 154(b) by 899 days.

(21) Appl. No.: 15/678,034

(22) Filed: Aug. 15, 2017

Related U.S. Application Data

(63) Continuation of application No. 13/798,162, filed on Mar. 13, 2013, now Pat. No. 9,760,140, which is a continuation-in-part of application No. 13/624,970, filed on Sep. 24, 2012, now abandoned, which is a continuation-in-part of application No. 13/269,531, filed on Oct. 7, 2011, now abandoned, which is a continuation-in-part of application No. 13/162,564, filed on Jun. 16, 2011, now Pat. No. 8,093,751, which is a continuation of application No. 12/878,040, filed on Sep. 9, 2010, now Pat. No. 7,964,989.

(60) Provisional application No. 61/391,663, filed on Oct. 10, 2010, provisional application No. 61/361,402, filed on Jul. 3, 2010.

(51) Int. Cl.
*G06F 1/26* (2006.01)
*H01R 13/70* (2006.01)

(52) U.S. Cl.
CPC ............. *G06F 1/266* (2013.01); *H01R 13/70* (2013.01); *Y02B 70/30* (2013.01); *Y02B 90/20* (2013.01); *Y04S 20/00* (2013.01); *Y04S 20/242* (2013.01); *Y04S 40/128* (2013.01)

(58) Field of Classification Search
CPC .......... G06F 1/266; H01R 13/70; Y02B 90/20; Y04S 20/00; Y02B 70/30; Y04S 20/242; Y04S 40/128
See application file for complete search history.

(56) References Cited

U.S. PATENT DOCUMENTS

| 4,418,333 | A  | * | 11/1983 | Schwarzbach et al. .................... H05B 47/185 340/4.3 |
| 8,019,883 | B1 | * | 9/2011  | Margulis ............. G06T 15/005 709/231 |

(Continued)

OTHER PUBLICATIONS

Wikipedia contributors. (Apr. 15, 2020). IEEE 802.11s. In Wikipedia, The Free Encyclopedia. Retrieved 14:24, Oct. 20, 2020, from https://en.wikipedia.org/w/index.php?title=IEEE_802.11s&oldid=951195125 (Year: 2020).*

*Primary Examiner* — Daniel Cavallari
(74) *Attorney, Agent, or Firm* — Clause Eight; Michael Catania

(57) ABSTRACT

A system and method for remotely monitoring, measuring and controlling power to an electrically powered device is disclosed herein. The system preferably comprises an apparatus, an electrically-powered device and a controller. The apparatus preferably comprises a cord, an alternating current outlet socket, an alternating current input plug, an electro-mechanical relay, a processor and a transceiver. The system preferably uses a WiFi communication signal to transmit commands from the remote controller to the apparatus.

14 Claims, 18 Drawing Sheets

(56) References Cited

U.S. PATENT DOCUMENTS

| | | | |
|---|---|---|---|
| 8,193,929 B1* | 6/2012 | Siu et al. ........... | H04L 12/2829 340/538 |
| 2014/0068027 A1* | 3/2014 | Flacco et al. ........ | H04L 12/282 709/220 |

* cited by examiner

METHOD, SYSTEM AND APPARATUS FOR MONITORING AND MEASURING POWER USAGE BY A DEVICE

CROSS REFERENCES TO RELATED APPLICATIONS

The Present Application is a continuation application of U.S. Pat. Application No. 13/798162, filed on Mar. 13, 2013, which is a continuation-in-part application of U.S. Pat. Application No. 13/624970, filed on Sep. 24, 2012, now abandoned, which is a continuation-in-part application of U.S. Pat. Application No. 13/269531, filed on Oct. 7, 2011, now abandoned, which claims priority to U.S. Provisional Pat. Application No. 61/391663, filed on Oct. 10, 2010, now expired, and is a continuation-in-part application of U.S. Pat. Application No. 13/162564, filed on Jun. 16, 2011, now U.S. Pat. No. 8093751, issued on Jan. 10, 2012, which is a continuation application of U.S. Pat. Application No. 12/878040, filed on Sep. 9, 2010, now U.S. Pat. No. 7964989, issued on Jun. 21, 2011, which claims priority to U.S. Provisional Pat. Application No. 61/361402, filed on Jul. 3, 2010, now expired, all of which are hereby incorporated by reference in their entireties.

STATEMENT REGARDING FEDERALLY SPONSORED RESEARCH OR DEVELOPMENT

Not Applicable

BACKGROUND OF THE INVENTION

Field of the Invention

The present invention generally relates to monitoring, measuring and controlling power to an electrically powered device. More specifically, the present invention relates to a system, method and apparatus for monitoring, measuring and controlling power to an electrically powered device.

Description of the Related Art

The prior art discusses various method and systems for controlling power to an electrically power device.

One example is Dresti et al., U.S. Pat. No. 6642852 for a *Remote Control Device With Appliance Power Awareness* which discloses placing a device in a desired powered state through use of a infrared remote with radiofrequency capabilities.

Another is Lou et al, U.S. Pat. Publication No. 2007/0115695 for a *Power Supply With Low Standby Loss*.

Yet another is Ewing et al., U.S. Pat. No. 7171461 for a *Network Remote Power Management Outlet Strip*.

Yet another is Lee et al., U.S. Publication No. 2010/0079001 for a *Outlet Switch Socket Device*.

The prior art fails to disclose a system and method for remotely monitoring and controlling power to an electrically powered device.

BRIEF SUMMARY OF THE INVENTION

The present invention provides a system and method for monitoring and controlling power to an electrically powered device. The present invention provides an effective component for power savings, control and customization for commercial and residential buildings.

One aspect of the present invention is a system for power control with remote Wi-Fi management using web based user interfaces accessible by a home PC, an office laptop or a smartphone such as an iPHONE available from Apple, Inc. The system is applicable to commercial and residential buildings. The features afforded to end-users (commercial building managers or homeowners) by the present invention allow for substantial reduction in energy consumption without having to rewire a building.

The present invention is designed and positioned as an easy to use and safe enhancement for controlling power to electrical devices by building managers, information technology managers and homeowners. The present invention relies on existing technologies, protocols to adhere to all necessary safety and regulatory requirements.

Another aspect of the present invention is a system for monitoring and controlling electrical power to an electrically-powered device. The system includes an apparatus, an electrically-powered device and a controller. The apparatus includes a housing having a power outlet connection, a processor configured to monitor and measure a power usage through the apparatus, an electro-mechanical relay for controlling power, and a transceiver for receiving commands to the apparatus and for transmitting power usage data from the apparatus. The electrically-powered device is connected to the power outlet connection of the apparatus. The controller transmits a plurality of commands to the apparatus. A command of the plurality of commands from the controller can control electrical power to the electrically powered device through the processor of the apparatus which is configured to control electrical power to the electrically powered device from the power outlet connection. The controller receives power usage data for the electrically-powered device from the transceiver of the apparatus.

The system preferably uses an 802.11 communication format. The electrically-powered device is preferably one of a vending machine, a computer, a monitor, a television, a printer, a lamp and a radio.

Another aspect of the present invention is an apparatus for monitoring and controlling electrical power to an electrically-powered device. The apparatus comprises a housing, at least one alternating current outlet socket, an alternating current input plug, an electro-mechanical relay, a processor and a transceiver. The alternating current outlet socket receives a plug from an electrically-powered device. The alternating current input plug connects to an outlet to receive power. The electro-mechanical relay controls power to the alternating current outlet socket, the electro-mechanical relay electrically positioned between the alternating current input plug and the alternating current outlet socket. The processor is configured to instruct the electro-mechanical relay to enable electrical power to the at least one alternating current outlet socket and to disable electrical power to the at least one alternating current outlet socket. The processor is also configured monitor and measure a power usage through the apparatus. The transceiver receives a plurality of commands to the apparatus, and transmits the warning message from the apparatus. The transceiver is in electrically communication with the processor. A command of the plurality of commands received at the apparatus can control electrical power to the electrically powered device through the processor of the apparatus.

Yet another aspect of the present invention is a method for monitoring and controlling electrical power to an electrically-powered device. The method includes monitoring and measuring a power usage of an electrically powered device connected to an apparatus. The method also includes transmitting the power usage of the electrically powered device to a remote controller. The method also includes transmitting a command from the remote controller over a network, the command to disable power to the electrically powered device. The method also includes receiving the command at a transceiver of the apparatus. The method also includes communicating the command from the transceiver to a processor of the apparatus. The method also includes switching an electro-mechanical relay from an enabling state to a disabling state to disable power to the electrically powered device, the electro-mechanical relay receiving instructions from the processor to switch from an enabling state to a disabling state. The method also includes transmitting a response to the remote controller from the transceiver of the apparatus, the response updating the status of the electrically powered device. The method also includes receiving the response from the apparatus over the network at the remote controller.

The method further includes storing the power usage data by one of hour, day, week, month and year.

The method preferably uses a WiFi communication format.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
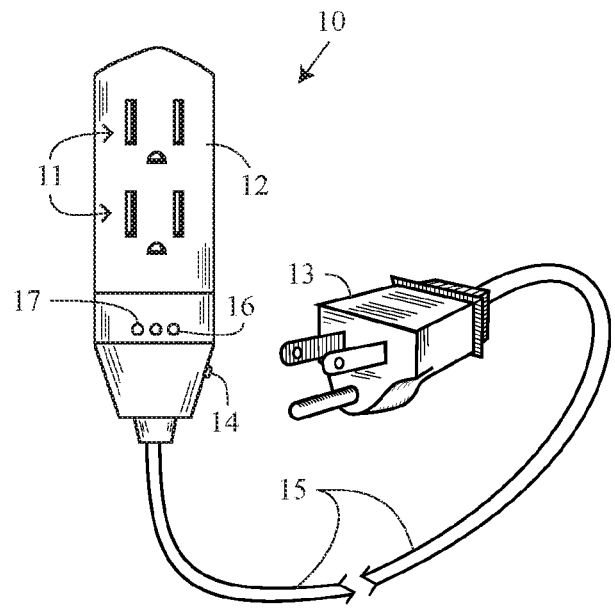
FIG. 1 is a front view of an apparatus for controlling power to an electrically powered device.
Figure 2:
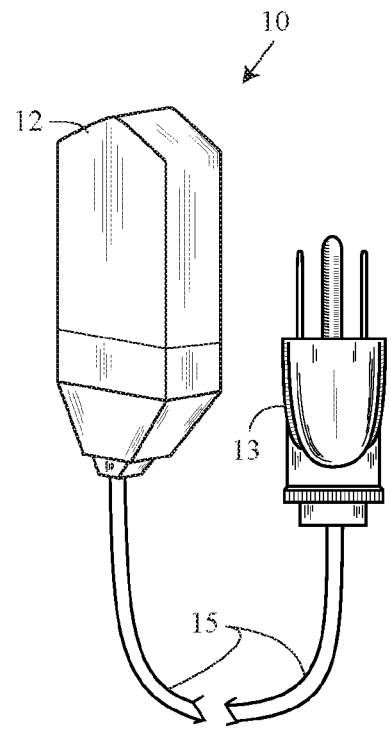
FIG. 2 is a back perspective view of the apparatus of FIG. 1.
Figure 3:
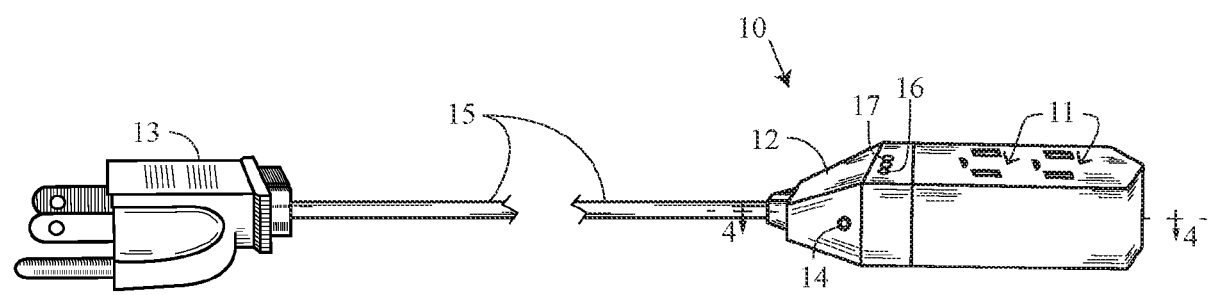
FIG. 3 is a top perspective view of the apparatus of FIG. 1.

A preferred embodiment of an apparatus 10 utilized for monitoring and controlling electrical power to an electrically-powered device is shown in FIGS. 1-3, in the form of an extension cord. The apparatus 10 comprises of at least one controlled socket 11, a casing 12, a plug 13, a switch 14, and a cord 15.

Figure 4:
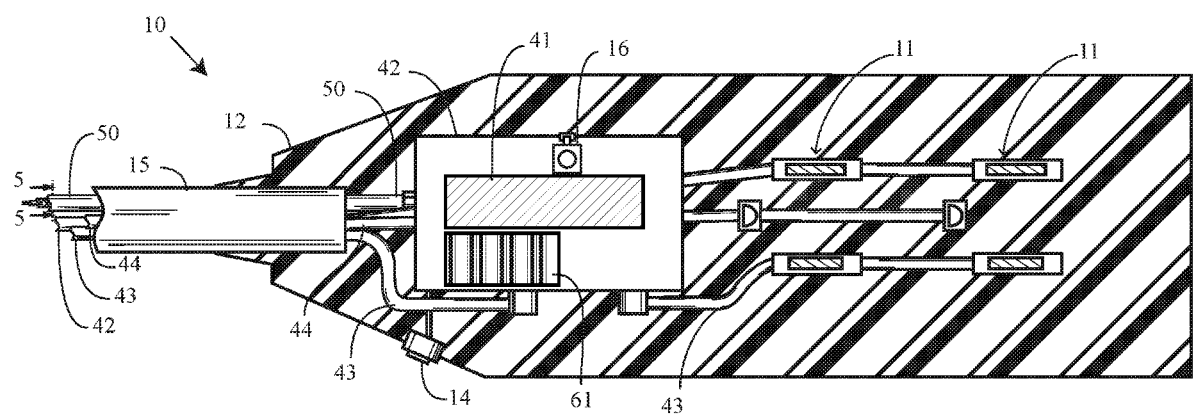
FIG. 4 is a sectional view of the apparatus shown in FIG. 3 taken along the line 4-4.
Figure 6:
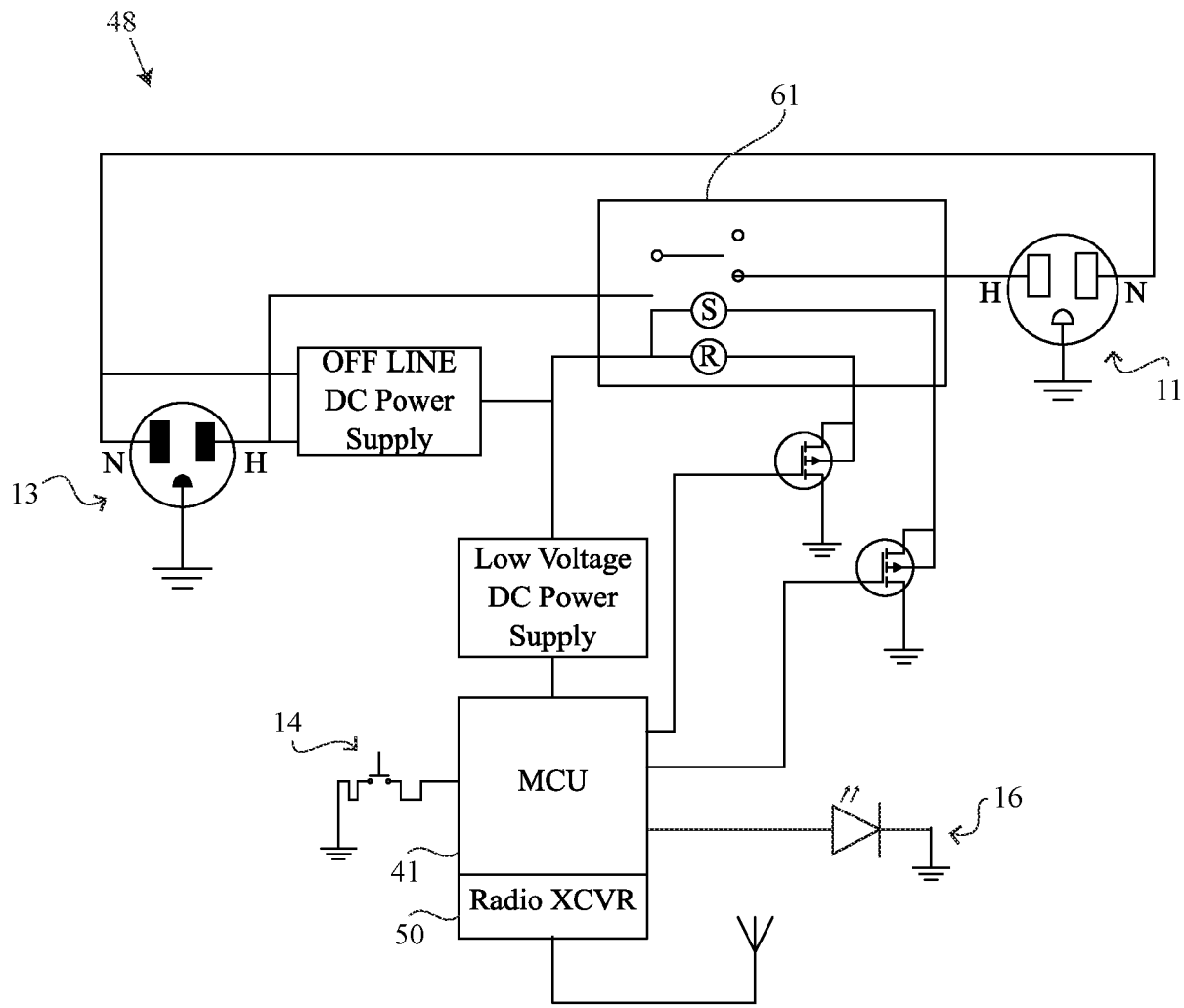
FIG. 6 is a circuit diagram of an apparatus for controlling power to an electrically powered device.

In FIG. 4, the interior components of the apparatus 10 are shown and in FIG. 6 a circuit block diagram for the apparatus 10 is shown. The apparatus 10 further comprises at least a radio transceiver 50, a microprocessor 41, a switch 61, and a power converter. Additionally, light-emitting diodes (LED) 45 provide status indication.

The plug 13 is used to receive alternating current (AC) power, and the switch 61 is connected in between the socket 11 and the plug 13.

The microprocessor 41 receives direct current (DC) power, decodes a control signal from a remote control, such as a handheld device, via the radio transceiver 50, and then controls the switch 61 based on the decoded control signal.

The switch 61 is preferably a latching relay controlled by the microprocessor 41, according to the control signal received from the remote control device. The latching relay minimizes the power usage of the electrical device connected to the apparatus 10, independent of the state of the switch 61.

Further embodiments of the present invention include additional onboard energy storage, with sensing or measuring capabilities, in various form factors embedded or interfaced with various electrical components such as, but not limited to; cords, outlets, converters, circuit breakers and surge protectors. Additional embodiments of the present invention include combining a single or multiple energy harvesting sources to provide power to control the relay.

In the preferred embodiment, the radio transceiver preferably includes an antenna 50 positioned within the cord 15 in order to increase the reception power of transceiver. In addition to the antenna, the cord 15 also comprises of three wires 42-44 (hot, neutral and ground), which are further detailed in FIG. 5. The antenna runs parallel in the power cord for increased performance.

Figure 5:
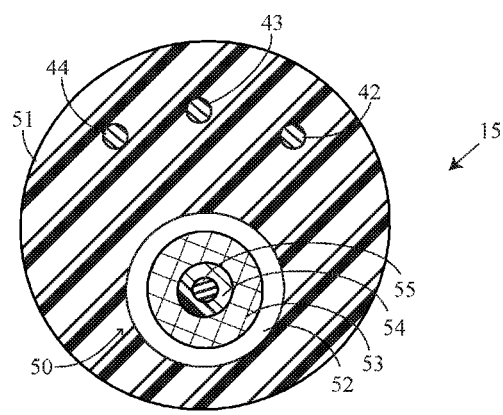
FIG. 5 is a sectional view of the cord shown in FIG. 4 taken along the line 5-5.

FIG. 5 shows the internal components of the cord 15. There are conductors for the three wires 42-44 for the socket and a fourth encased conductor 55 for the antenna 50, all preferably molded within insulating material 51. The antenna 50 preferably comprises of a protective sleeve 52, a shielding copper braid 53, foam 54, and a copper conductor 55; or other such materials typically used to protect the antenna 50 from interference of the other wires 42-44. Further, the antenna 50 is preferably positioned as far as possible from the three other wires 42-44 to minimize the interference from the wires 42-44.

The apparatus 10 of this embodiment preferably has two controlled sockets 11 located on the front of the module. The casing 12 is preferably injection molded insulating material. Both sockets 11 are controlled with the same ON/OFF command. The apparatus 10 is comparable in function and usability to standard extension cords and plugs. The mechanical interactions for the user using the apparatus 10 does not compromise safety or functionality compared to standard extension cords and plugs. The apparatus 10 plugs securely into a single outlet of a standard duplex wall receptacle and the plug 13 is configured in such a way that the other outlet is not impeded. Each socket 11 of the apparatus 10 preferably has a current rating of 15 amperes (A) at 120 volts in alternating current (VAC).

A pushbutton switch 14 on the apparatus 10, when activated, preferably resets the apparatus 10 to the factory default conditions for the configuration settings.

The apparatus 10 has a LED indicator 16 that is ON when the apparatus 10 obtains and maintains a wireless connection to the LAN (local area network) and OFF when the apparatus 10 does not have a wireless connection to the LAN.

The LED indicator 16 also preferably represents the state of the outlet power for the apparatus 10 as well, which is preferably accomplished by blinking in a set pattern. Alternatively, the LED indicator 16 flashes accordingly to indicate the status of the wireless connection.

In the event of a power failure, the apparatus 10 automatically returns managed sockets 11 to the previous state, prior to power interruption. In the event of a dropped wireless connection, the apparatus 10 maintains port settings last set by the user, prior to the loss of wireless connectivity, until the wireless connectivity is restored or until the user disconnects the apparatus 10.

Figure 19:
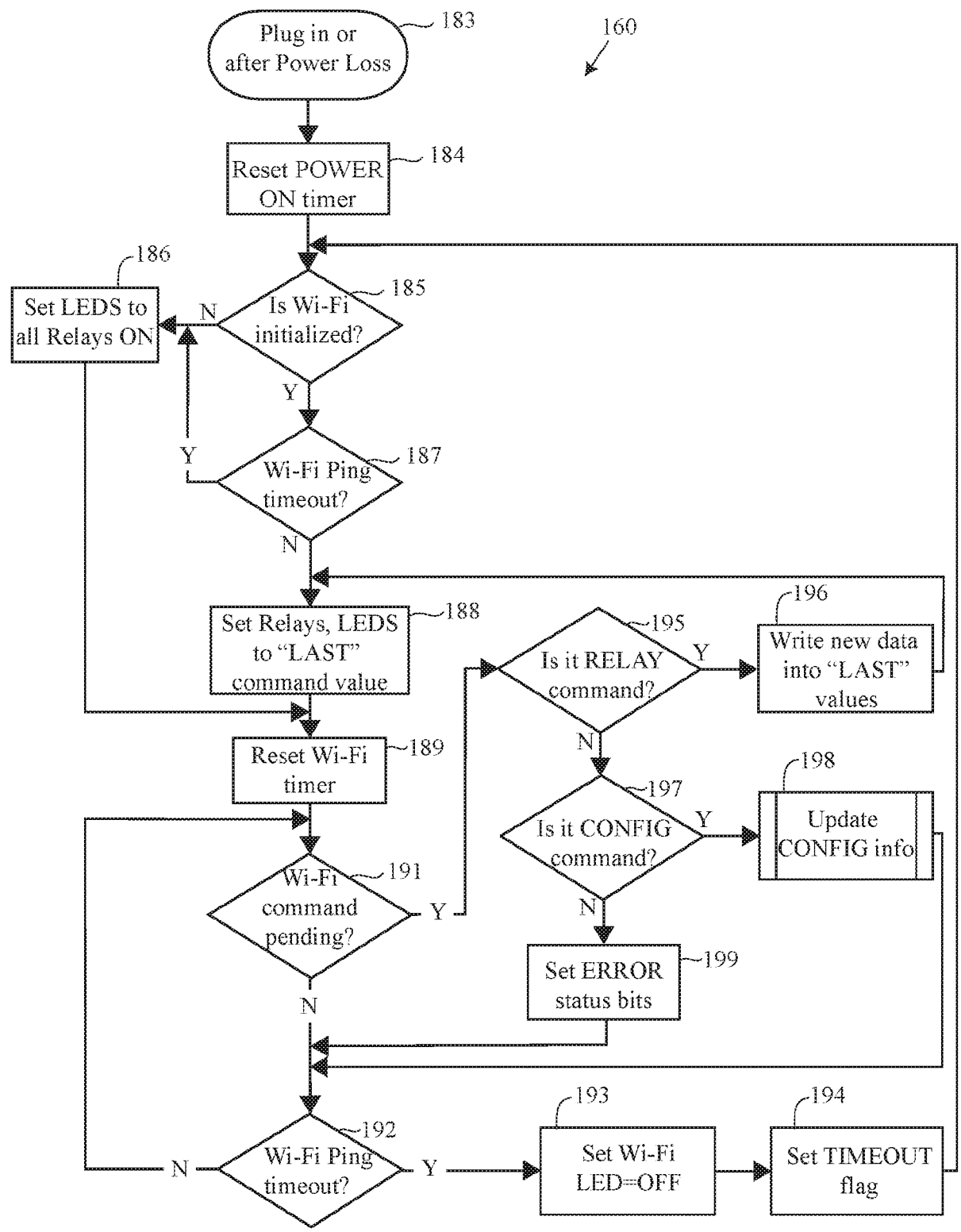
FIG. 19 is a flow chart of control logic for a method for controlling power to an electrically powered device.

A procedure for initializing an apparatus is shown in FIG. 19. At block 183, after a power loss or when the apparatus 10 is plugged in, the microcontroller 41 executes a program 160 for initializing the apparatus 10. At block 184, the POWER ON timer is reset.

At decision 185, if the Wi-Fi is not initialized, the LEDs for all of the relays are set to ON and the apparatus is the Wi-Fi timer is reset at block 189, which times the seconds passed since the last ping.

If the Wi-Fi is initialized at decision block 185 and there is no ping timeout at decision block 187, then the relays are set to the last command value before the loss of power 188. If there is a ping timeout at decision block 187 then the relays are set to ON a block 186, and then the Wi-Fi timer is reset at block 189.

After resetting the Wi-Fi timer at block 189, the program 160 checks for any pending Wi-Fi commands at decision block 191.

If there are no pending Wi-Fi commands at decision block 191 and no ping timeouts at decision block 192, then the program 160 returns to check for a Wi-Fi command at decision block 191. If there is a ping timeout at decision block 192 then the Wi-Fi LED indicator 16 is set to OFF at block 193 and the timeout flag is set at block 194. Then the program 160 returns to the Wi-Fi initialization step at decision block 185.

If there are pending Wi-Fi commands at block 191 and there is a relay command at decision block 195, then the new data from the command is written into the "LAST" command values block 196 and the program 160 returns to setting the relays and LED to the "LAST" command value at block 188. If there is no relay command at decision block 195 then the program 160 checks for a CONFIG command at decision block 197.

If there is a CONFIG command at decision block 197, then the configuration information is updated at block 198 and the program 160 returns to checking for ping timeouts at decision block 192.

If there is no CONFIG command at decision block 197, then ERROR status bits are set and the program 160 returns to checking for ping timeouts at decision block 192.

Figure 7:
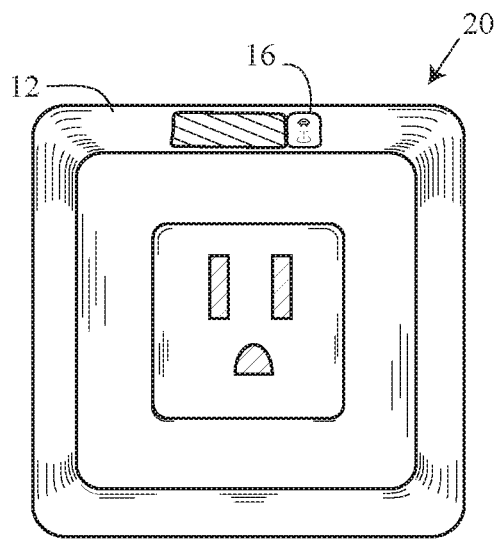
FIG. 7 is a front view of an alternative embodiment of an apparatus for controlling power to an electrically powered device.
Figure 8:
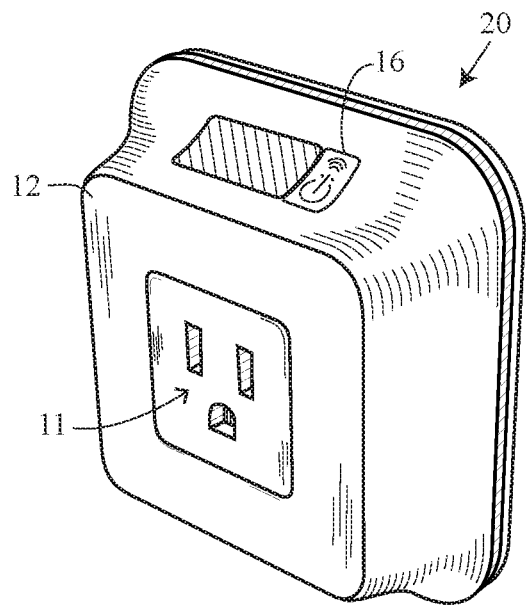
FIG. 8 is a side perspective view of the apparatus of FIG. 7.
Figure 9:
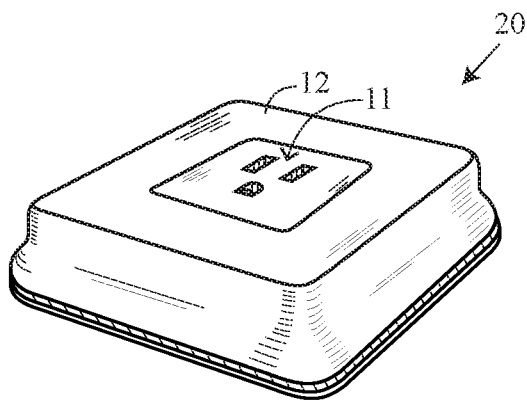
FIG. 9 is a top perspective view of the apparatus of FIG. 7.
Figure 10:
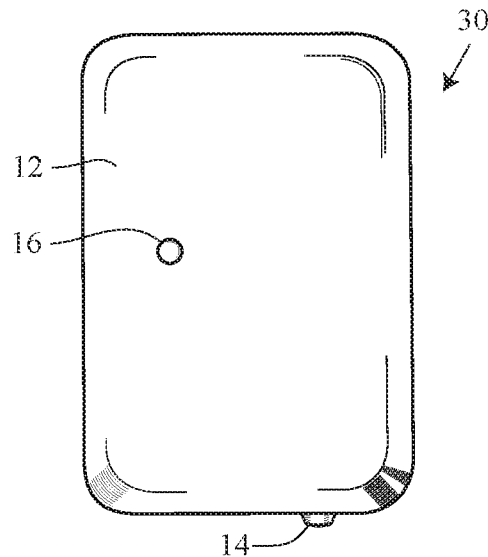
FIG. 10 is a front view of an alternative embodiment of an apparatus for controlling power to an electrically powered device.
Figure 11:
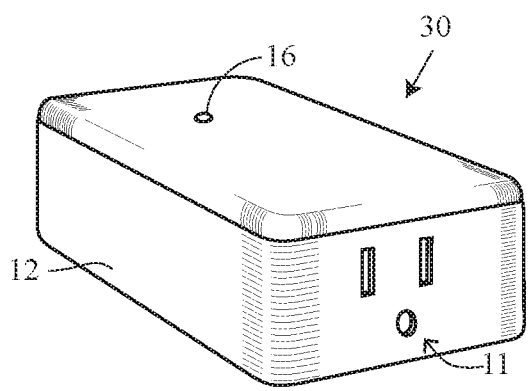
FIG. 11 is a top perspective view of the apparatus of FIG. 10.
Figure 12:
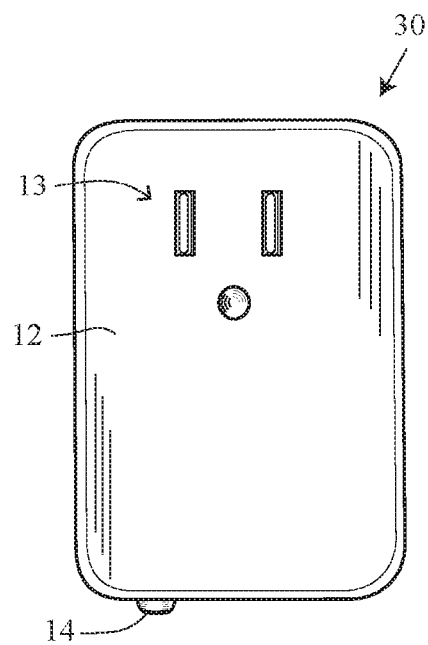
FIG. 12 is a back view of the apparatus of FIG. 10.
Figure 13:
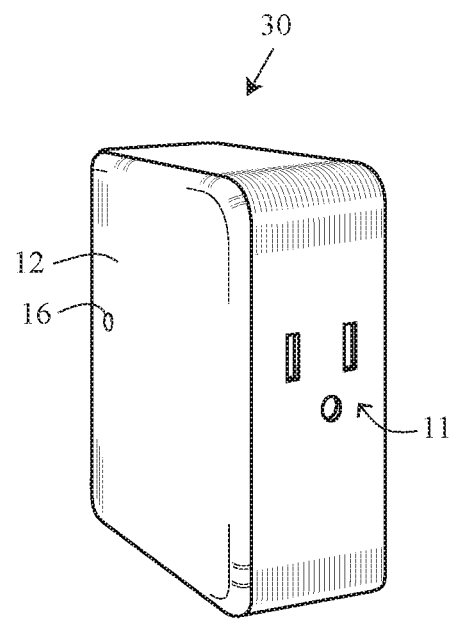
FIG. 13 is a side perspective view of the apparatus of FIG. 10.

An alternative embodiment of an apparatus 20 utilized for controlling power to an electrically powered device is shown in FIGS. 7-9, in the form of a compact box style receptacle.

Yet another alternative embodiment of an apparatus 30 utilized for controlling power to an electrically powered device is shown in FIGS. 10-13, in the form of a compact box style receptacle.

The alternative embodiments are similar to the preferred embodiment, the distinction being in the physical type, and/or shape.

The apparatus 20/30 is preferably shaped as a rectangle and is approximately 2 inches × 2 inches ×1.5 inches. The apparatus 20/30 preferably has two controlled sockets 11 located on the sides of the module. The casing 12 is preferably injection molded insulating material. Both sockets 11 are controlled with the same ON/OFF command. The apparatus 20/30 is comparable in function and usability to standard extension cords and plugs. The mechanical interactions for the user using the apparatus 20/30 does not compromise safety or functionality compared to standard extension cords and plugs. The apparatus 20/30 plugs securely into a single outlet of a standard duplex wall receptacle and the plug 13 is configured in such a way that the other outlet is not impeded. Each socket 11 of the apparatus 20/30 has a current rating of 15 A at 120 VAC.

The apparatus 20/30 has a LED indicator 16 that is ON when the apparatus 20/30 obtains and maintains a wireless connection to the LAN (local area network) and OFF when the apparatus 20/30 does not have a wireless connection to the LAN.

In the event of a power failure, the apparatus 20/30 automatically returns managed sockets 11 to the previous state, prior to power interruption. In the event of a dropped wireless connection, the apparatus 20/30 maintains port settings last set by the user, prior to the loss of wireless connectivity, until the wireless connectivity is restored or the user disconnects the apparatus 20/30.

A pushbutton switch 14 on the apparatus 20/30, when activated, preferably resets the apparatus 20/30 to the factory default conditions for the configuration settings.

Figure 14:
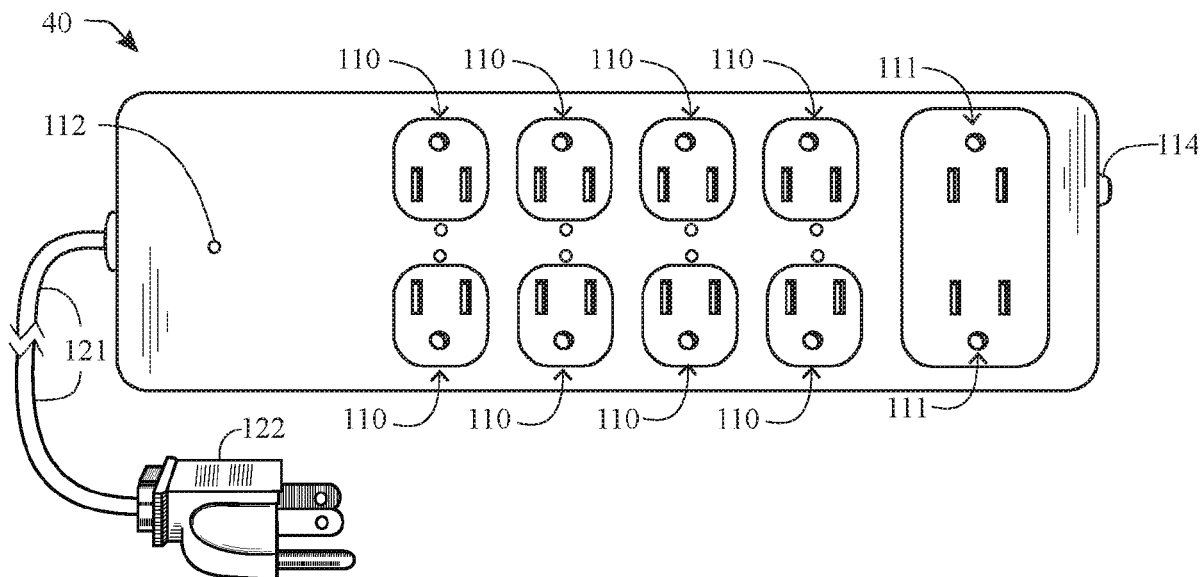
FIG. 14 is a front view of an alternative embodiment of an apparatus for controlling power to an electrically powered device.
Figure 15:
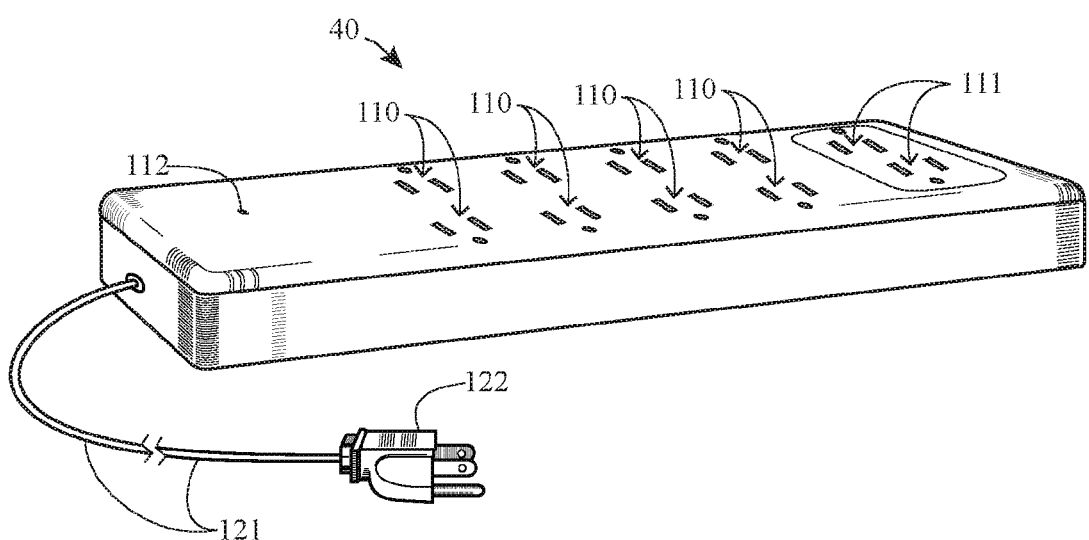
FIG. 15 is a side perspective view of the apparatus of FIG. 14.

Yet another embodiment of an apparatus 40 utilized for controlling power to an electrically powered device is shown in FIGS. 14-15, in the form of a power strip.

The embodiment of FIGS. 14-15 is another variation of the apparatus 10 in the form of a power strip. The apparatus 40 is shaped similarly to currently available power strips. The casing 12 is preferably injection molded insulating material. The apparatus 40 preferably has six independently controlled sockets 110 and two sockets which remain constantly ON 111. The device is comparable in function and usability to standard power strips and plugs. The mechanical interactions for the user using the apparatus 40 does not compromise safety or functionality compared to standard extension cords and plugs.

The apparatus 40 plugs securely into a single outlet of a standard duplex wall receptacle and the plug 13 is configured in such a way that the other outlet is not impeded. Each socket 110-111 of the apparatus 40 preferably has a current rating of 15 A at 120 V AC.

The apparatus 40 has a LED indicator 112 that is ON when the device obtains and maintains a wireless connection to the LAN (local area network) and OFF when the device does not have a wireless connection to the LAN.

In the event of a power failure, the apparatus 40 automatically returns managed sockets 110 to the previous state, prior to power interruption. In the event of a dropped wireless connection, the apparatus 40 maintains port settings last set by the user, prior to the loss of wireless connectivity, until the wireless connectivity is restored or the user disconnects the apparatus 40.

A pushbutton switch 114 on the device 40, when activated, preferably resets the device 40 to the factory default conditions for the configuration settings.

Figure 16:
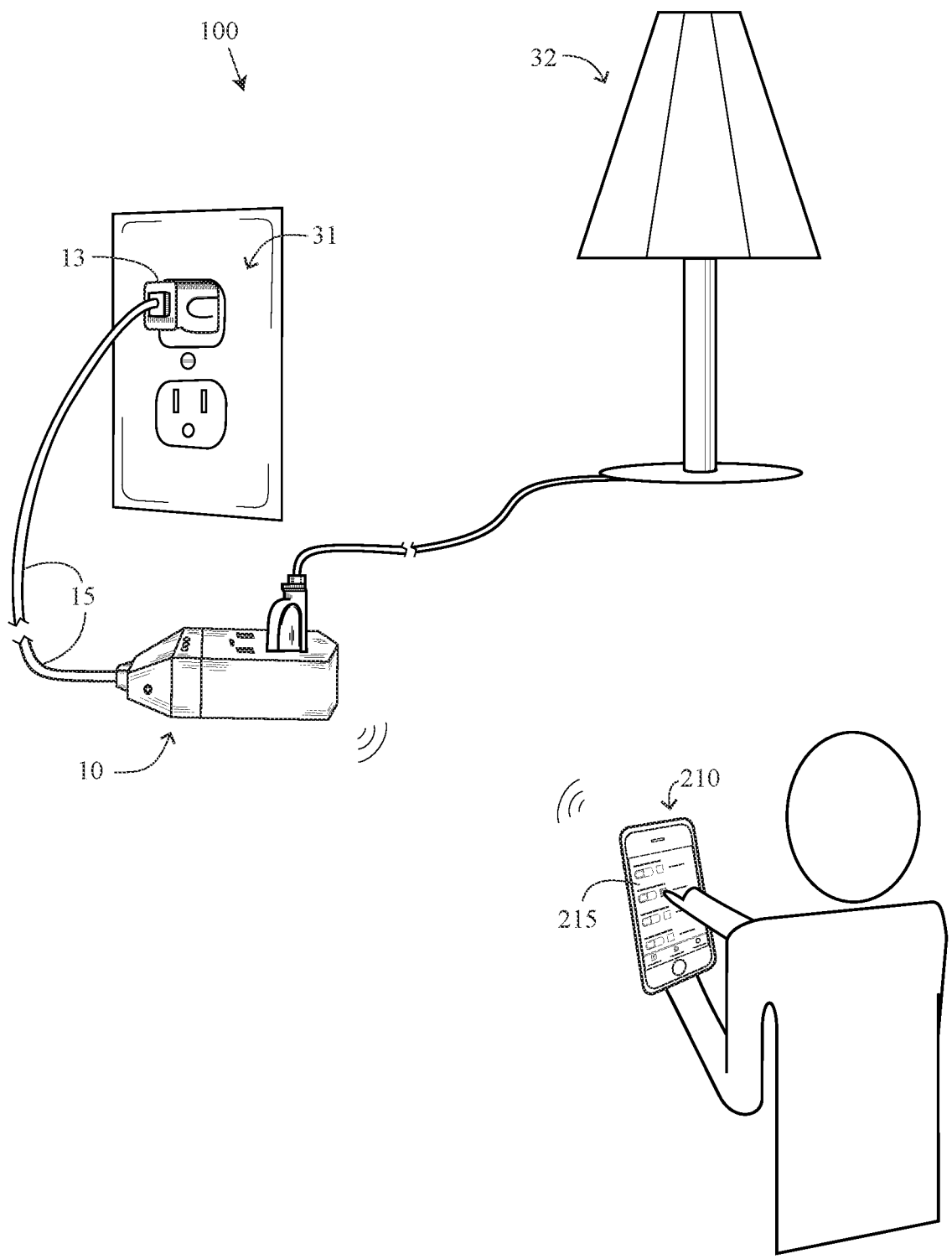
FIG. 16 is a frontal elevation view of FIG. 1 connected to a wall receptacle at one end and to a lamp at the opposite end, and a user controlling the apparatus with a wireless device.

A system 100 of the preferred embodiment is shown in FIG. 16. A table lamp 32 is plugged into one of the sockets 11 of the apparatus 10, and the plug 13 at the other end of the cord 15 of the apparatus 10 is plugged into a typical wall outlet 31. A user controls the lamp 32 from a distance using the touch screen commands 215 on a smartphone 210. A WiFi signal is sent from the smartphone 210 and received at the antenna 50, not shown in FIG. 16, of the transceiver of the cord 15. The WiFi signal instructs the microprocessor 41 of the apparatus 10 to deactivate the electrical power to the table lamp 32.

Figure 18:
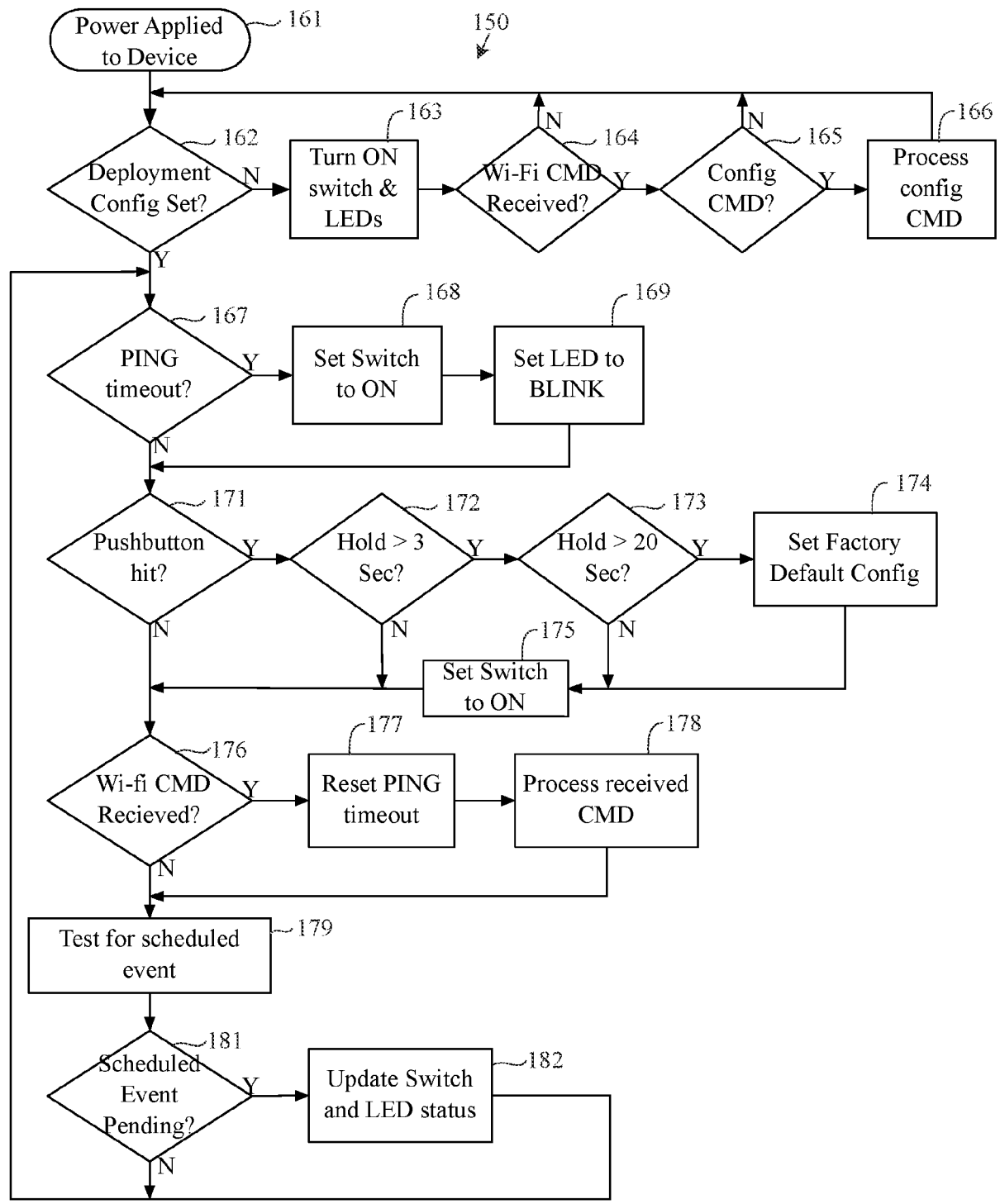
FIG. 18 is a flow chart of control logic for a method for controlling power to an electrically powered device.

When the apparatus 10 is connected to electrical power from the wall outlet at block 161, the microcontroller 41 executes a program 150, which is shown in FIG. 18.

If the deployment configuration is not set up at decision block 162 on the apparatus 10, then the switch 61 and the LED are turned on at block 163. If there is a no Wi-Fi command received at decision block 164, then the program 150 returns to check for the deployment configuration at decision block 162. If there is a Wi-Fi command received at decision block 164 but there is no configuration command at decision block 165, then the program 150 returns to check the deployment configuration at decision block 162. If there is a configuration command at decision block 165, then the configuration command is processed block 166 and the program 150 returns to check the deployment configuration at decision block 162.

If the deployment configuration is set up at decision block 162 and there are ping timeouts at decision block 167, then the switch 61 is set to ON at block 168 and the LED 16 is set to blink at block 169.

If there are no ping timeouts at decision block 167, then the program 150 checks if the pushbutton 14 was triggered at decision block 171. If the pushbutton 14 was held for more than 3 seconds at decision block 172 but less than 20 seconds at decision block 173, then the switch 61 is set to ON at block 175. If the pushbutton 14 was held for more than 20 seconds at decision block 173, then the factory default configuration is set at block 174 and the switch 61 is set to ON at block 175. If the pushbutton 14 was held for less than 3 seconds at decision block 172 then the program 150 moves on to the next step at decision block 176.

If a Wi-Fi command is received at decision block 176 then the ping timeout is reset block 177 and the command received is processed at block 178. Then the program 150 moves on to the next step block 179.

If a Wi-Fi command is not received at decision block 176, then the program 150 tests for scheduled events block 179.

If there is a scheduled event pending at decision block 181 then the switch 61 and LED 16 statuses are updated block 182 and the program 150 returns to check for ping timeouts decision block 167.

If there are no scheduled events pending decision block 181 then the program 150 returns to check for ping timeouts decision block 167.

Figure 20:
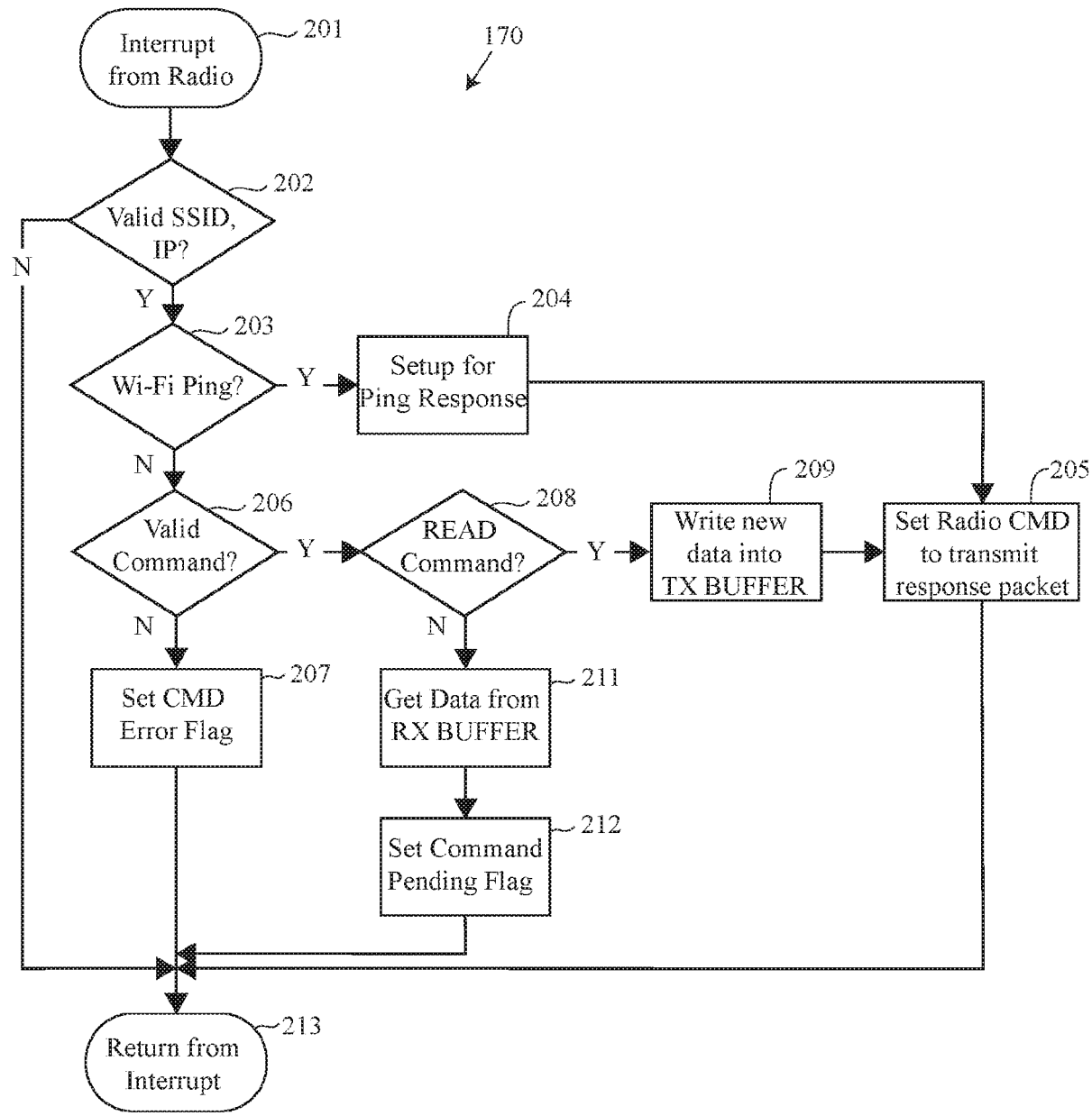
FIG. 20 is a flow chart for an interrupt command for an apparatus for controlling power to an electrically powered device.

In FIG. 20, a program 170 is executed when the microcontroller 41 receives an interrupt signal at block 201 from the radio 50; i.e., when the apparatus 10 receives a command, as in FIG. 16.

If the SSID and the IP (Internet Protocol) address are valid t decision block 202, and there is a Wi-Fi ping at decision block 203, then a ping response at block 204 is set up. The radio command is set to transmit a response packet at block 205, and then the interrupt service routine (ISR) returns at block 213.

If there is no Wi-Fi ping decision block 203 and the command is not valid decision block 206, then the command ERROR flag is set block 207 and the ISR returns at block 213.

If the command is valid decision block 206 and the read command is executed at decision block 208, the new data is written into the transmit (TX) buffer at block 209 and the radio command is set to transmit a response packet at block 205, and the ISR returns at block 213.

If the READ command is not executed at decision block 208, then data is retrieved from the receive (RX) buffer at block 211, the command PENDING flag is set at block 212, and the ISR returns at block 213.

The apparatus 10 permits the user to configure the apparatus 10 out of the box using a web user interface (WebUI), a personal computer ("PC") program or a WiFi enabled hand held device (smartphone) via ad-hoc wireless, allowing the user to program in home network information, such as the wireless router SSID (Service Set Identifier) and security keys, as necessary for web connectivity.

Figure 17:
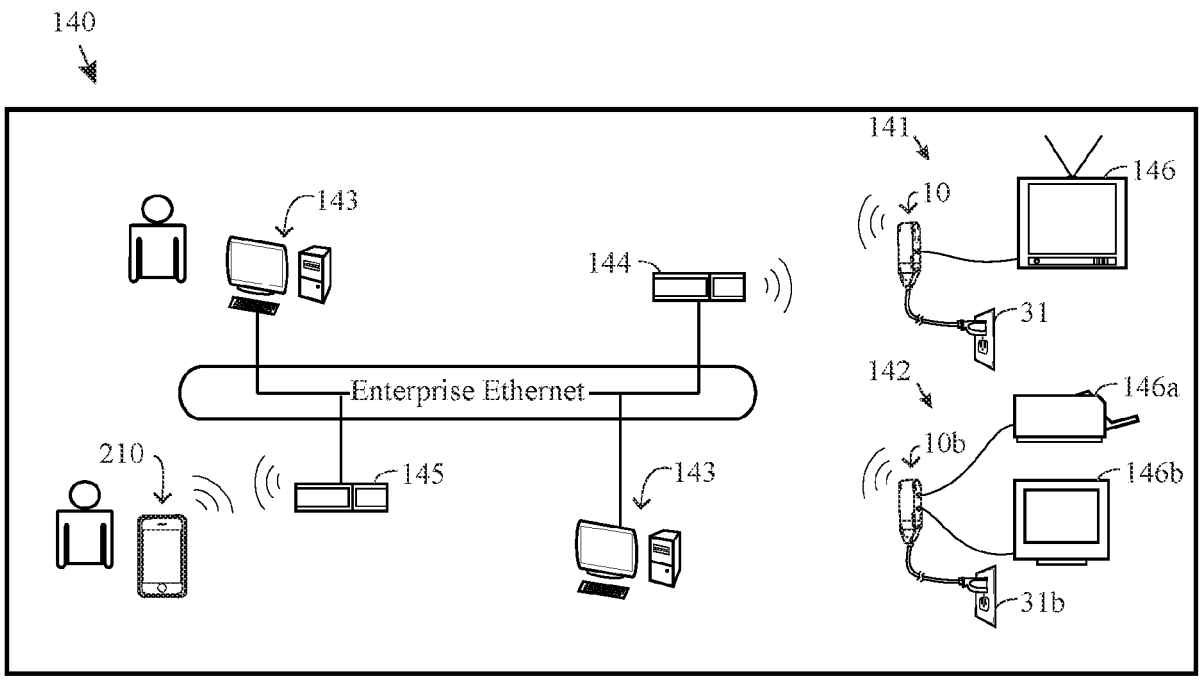
FIG. 17 is a block diagram of a system for controlling power to an electrically powered device.

A networked system 140 of the preferred embodiment is shown in FIG. 17.

Figure 17A:
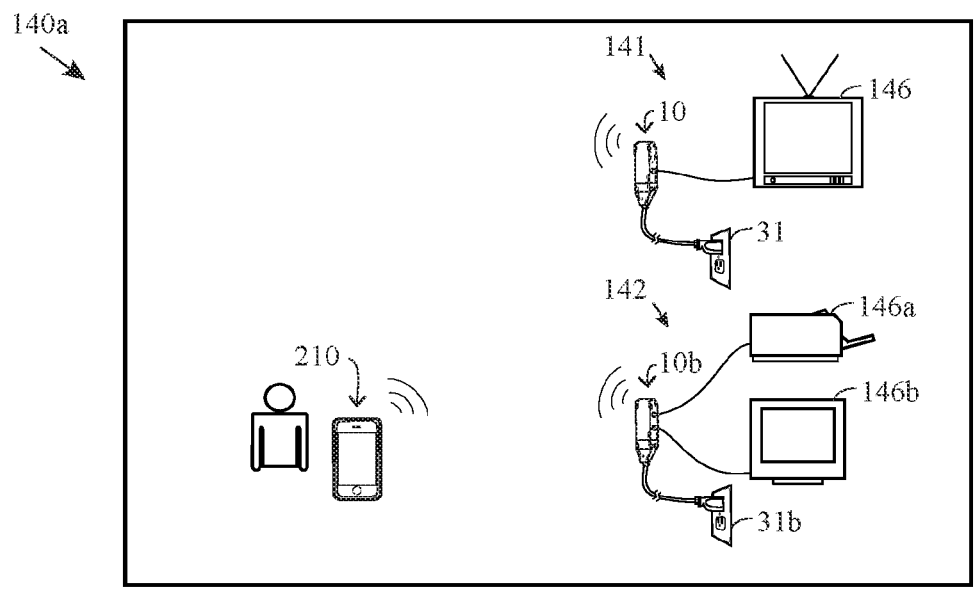
FIG. 17A is a block diagram of a system for controlling power to an electrically powered device.

The WebUI is preferably hosted on the apparatus 10 and is accessible via interconnected network devices. The WebUI, PC program or WiFi enabled hand held is addressable via the assigned IP address of the apparatus 10. The apparatus 10 can be controlled from various devices such as, but not limited to, computers 143 or mobile handhelds 210. In a typical network, the router 144 and the access point 145 provide the wireless connectivity between the apparatus 10 and the remote, such as a smart phone 210. An alternative embodiment of the system 140 is illustrated in FIG. 17A. In this embodiment, the mobile handheld device 210 wireless communicates directly with the antenna 50 of the apparatus 10 preferably using a WiFi communication protocol.

Figure 21:
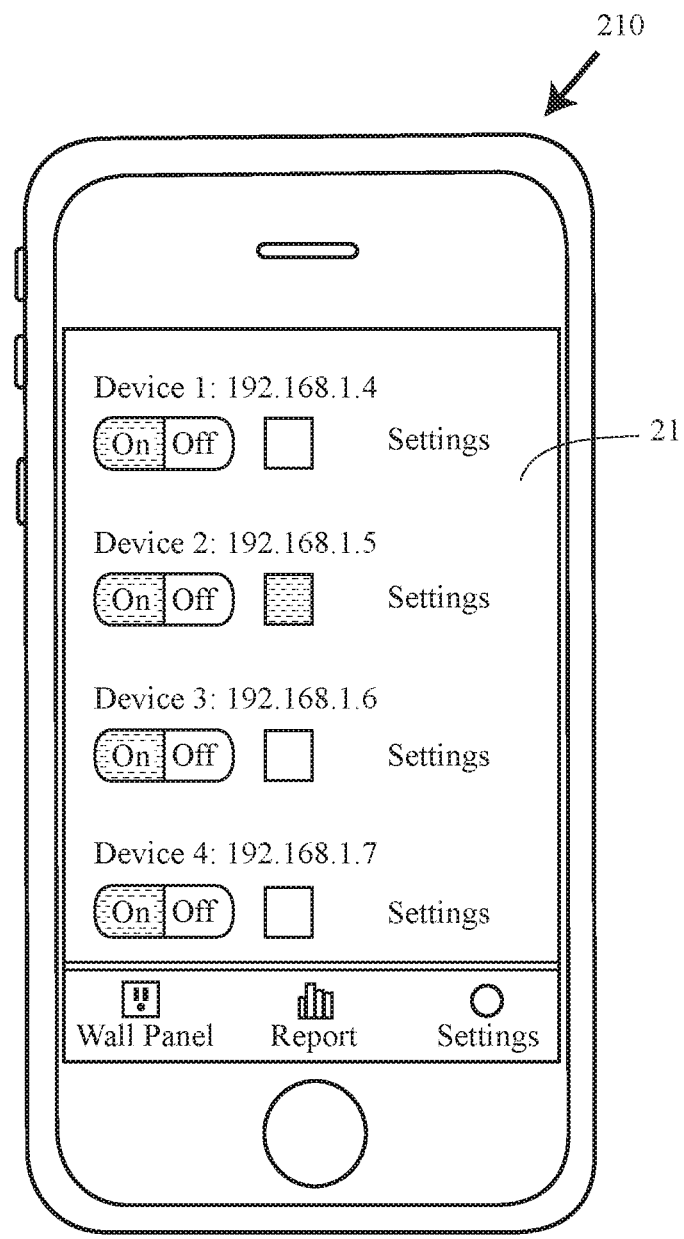
FIG. 21 is a front view of a smart phone for use with a system for controlling power to an electrically powered device.

FIG. 21 shows a smart phone 210 displaying touch screen commands 215 of an application for controlling power to electrically powered devices plugged into the apparatus 10.

In FIG. 17, a system 141 shows a television 146 plugged into the first installed apparatus 10, which is plugged into a wall outlet 31. Another system 142 shows a printer 146a and a monitor 146b plugged into a secondary apparatus 10b, which is plugged into a wall outlet 31b.

The first installed apparatus 10 is the master apparatus 10 and monitors the network for any additional apparatus 10b. When a new apparatus 10b is detected on the network, the first apparatus 10 remotely manages other apparatus 10b using a single WebUI, PC program or WiFi enabled hand held. The user will either: a) logon to the original apparatus 10 and have selectable tabs and additional options to manage all of the apparatus 10b on the network; or b) manage each apparatus 10b discretely using individual IP addresses. Local user settings to the individual apparatus 10b supersede commands and/or timers from the master apparatus 10. The apparatus 10 is compatible with various web browsers such as, but not limited to, Mozilla Firefox, Microsoft Explorer and Google Chrome.

Figure 22:
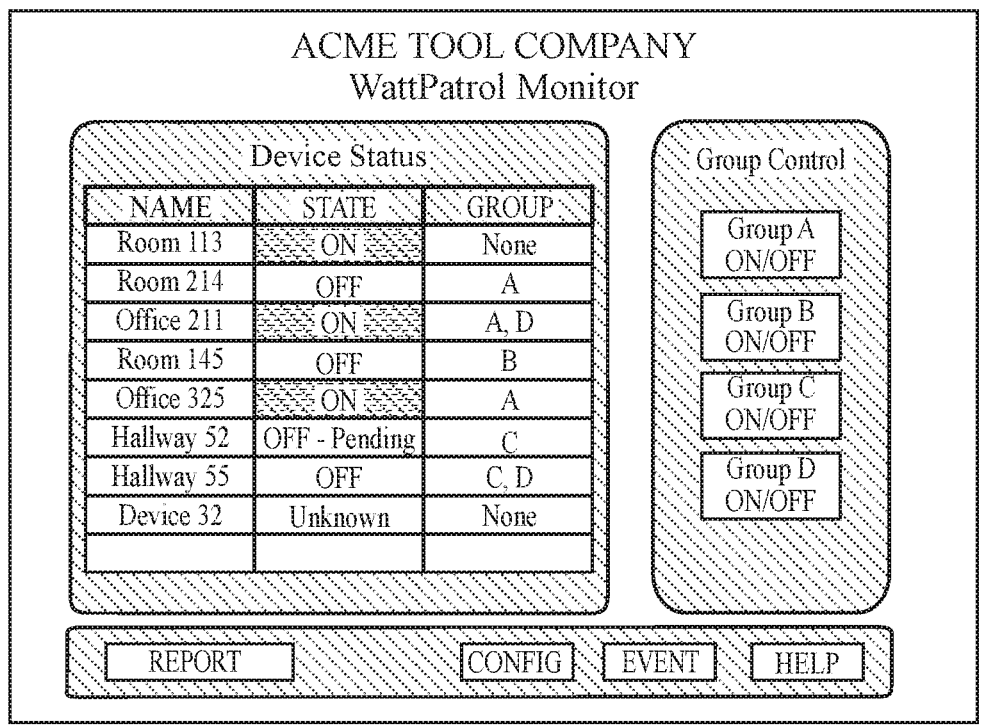
FIG. 22 is a screen view of a status chart of a system for controlling power to an electrically powered device.

A simple WebUI home page allows individual management and supervision of each socket 11 such as, but not limited to, setting multiple timers and toggling ON/OFF selections of individual sockets 11. An example of a web page, of a status window 190, is shown in FIG. 22. The status page 190 displays the status of the devices and users can turn devices OFF or ON from this page.

Figure 23:
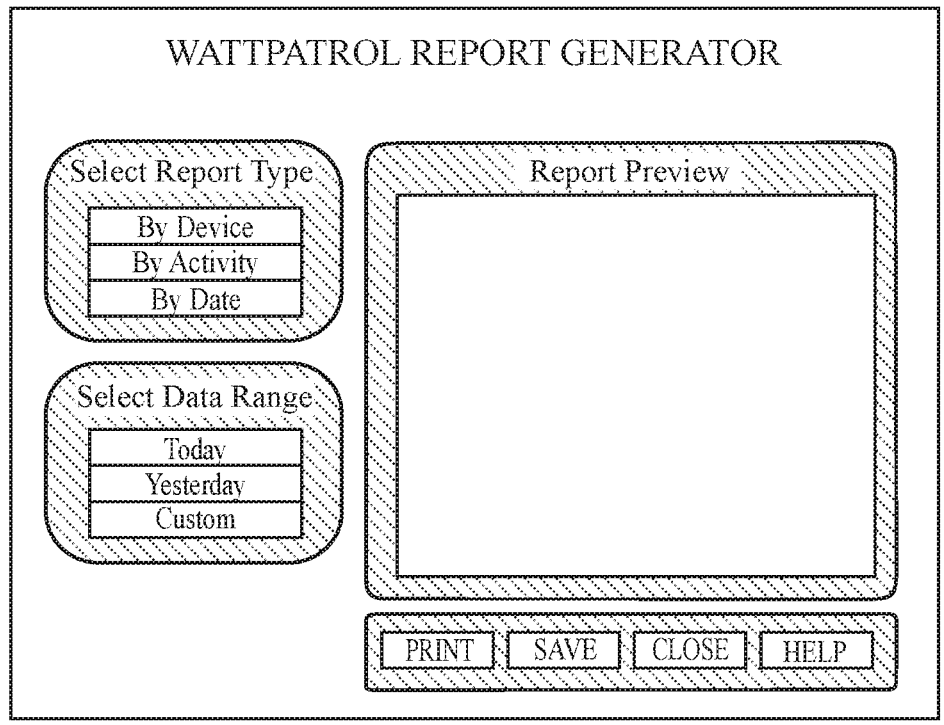
FIG. 23 is a screen view of a report generated by a system for controlling power to an electrically powered device.

FIG. 23 shows another example of a web page, a report window 200 that a user can access to generate a report in order to analyze or compare the consumption of energy by devices or activities or dates.

Figure 24:
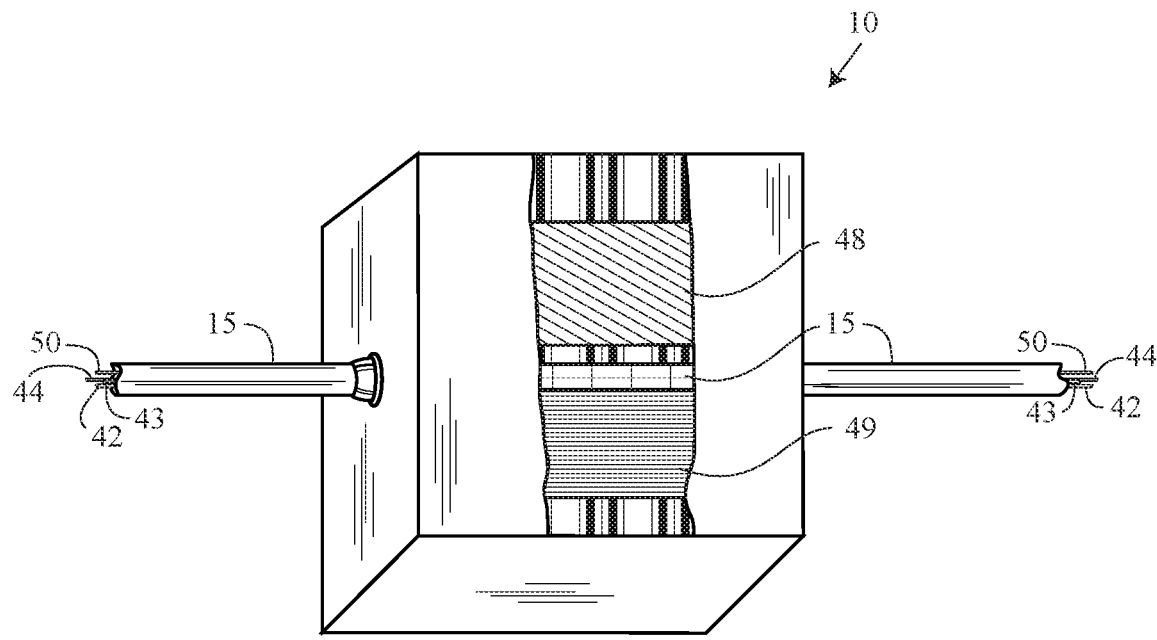
FIG. 24 is an elevational view of a cord embodiment of an apparatus with a junction box in a center region of the cord with exposed hot, neutral and ground wires.

Yet another embodiment of the present invention is illustrated in FIG. 24. In this embodiment, the apparatus 10 is a junction box with a cord 15 having the three wires 42-44 and the antenna 50. The junction box contains a high power relay 49 and most of the circuitry 48 shown in reference to FIG. 6. The loose wires 42-44 can be hard wired to various electrical powered devices and a fixed (household) power source or a mobile (generator) power source. The junction box is preferably a 4 inch × 4 inch non-metallic box. The junction box embodiment can be utilized with 115 volt applications, 220 volt applications and three-phase applications.

Figure 24A:
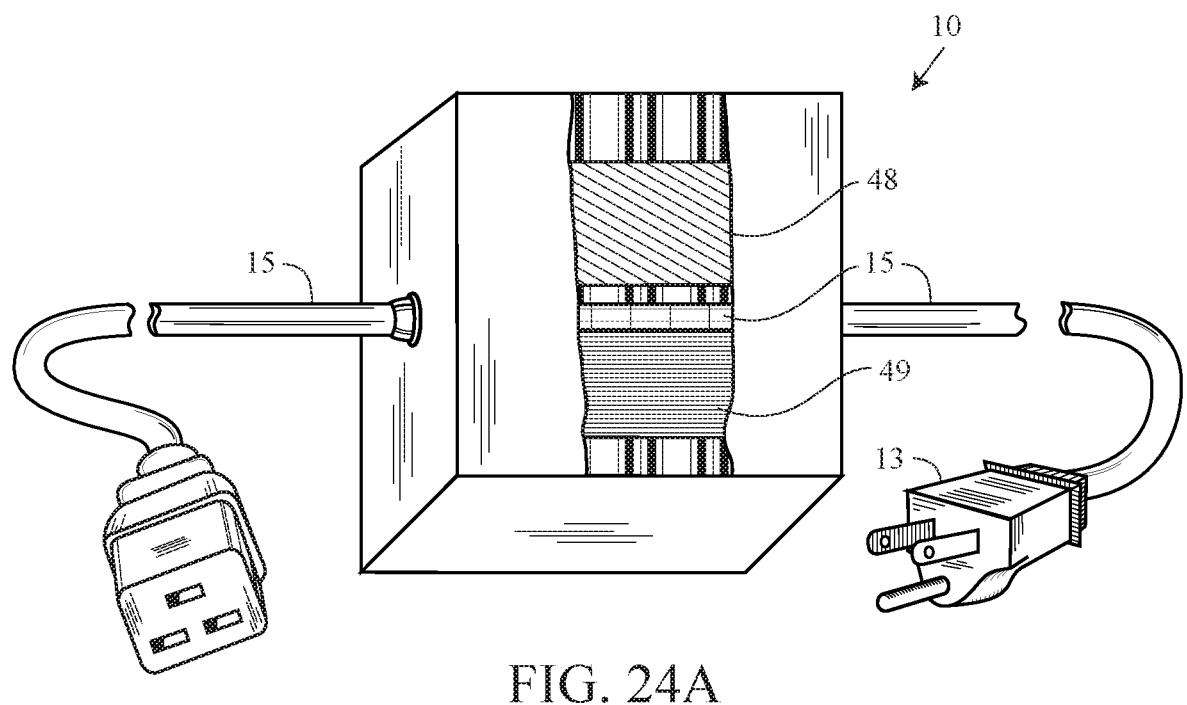
FIG. 24A is an elevational view of a cord embodiment of an apparatus with a junction box in a center region of the cord.

Yet another embodiment is shown in FIG. 24A. In this embodiment, the apparatus 10 is a junction box with a cord 15 connected to plug 13 on one end and a socket on the other end. The junction box contains a high power relay 49 and most of the circuitry 48 shown in reference to FIG. 6. The junction box is preferably a 4 inch x 4 inch non-metallic box. The junction box embodiment can be utilized with 115 volt applications, 220 volt applications and three-phase applications.

Figure 25:
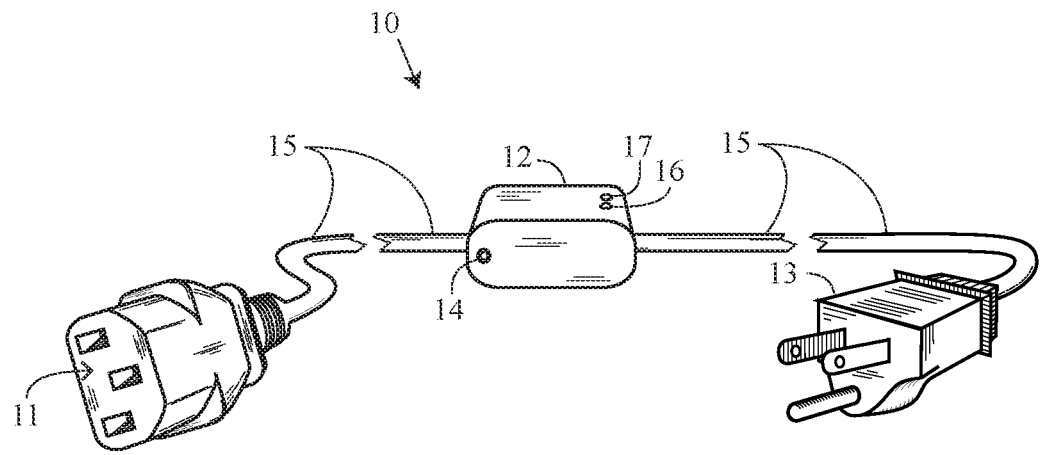
FIG. 25 is an elevational view of a cord embodiment of an apparatus with circuitry in a center region of the cord.

Yet another embodiment is illustrated in FIG. 25. In this embodiment, the apparatus has a cord 15 with the circuitry is in a central region of the cord 15 and shown as a bulge 12 in the cord 15. The cord has a plug 13 on one end and a socket 11 on the other end. A pushbutton switch 14 on the apparatus 10, when activated, preferably resets the apparatus 10 to the factory default conditions for the configuration settings. The apparatus 10 has a pair of LED indicators 16 and 17 that are ON when the apparatus 10 obtains and maintains a wireless connection to the LAN (local area network) and OFF when the apparatus 10 does not have a wireless connection to the LAN. The LED indicators 16 and 17 also preferably represent the state of the outlet power for the apparatus 10 as well, which is preferably accomplished by blinking in a set pattern. Alternatively, the LED indicators 16 and 17 flashes accordingly to indicate the status of the wireless connection.

Figure 25A:
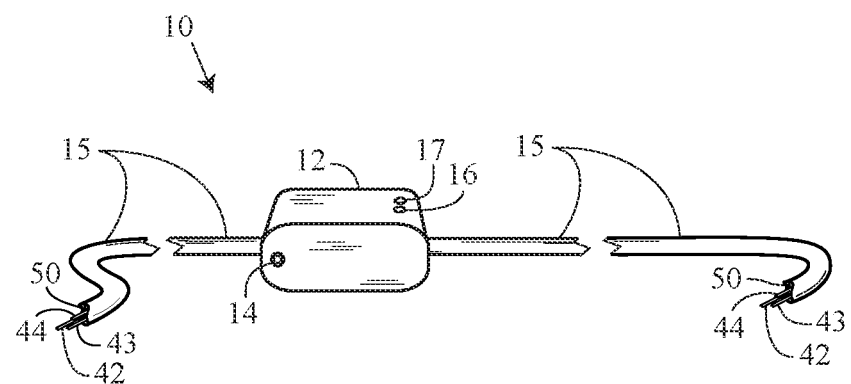
FIG. 25A is an elevational view of a cord embodiment of an apparatus with circuitry in a center region of the cord and both ends of the cord with exposed hot, neutral and ground wires.

Yet another embodiment is illustrated in FIG. 25A. In this embodiment, the apparatus has a cord 15 with the circuitry is in a central region of the cord 15 and shown as a bulge 12 in the cord 15. The cord has the three wires 42-44 and the antenna 50. The loose wires 42-44 can be hard wired to various electrical powered devices and a fixed (household) power source or a mobile (generator) power source. A pushbutton switch 14 on the apparatus 10, when activated, preferably resets the apparatus 10 to the factory default conditions for the configuration settings. The apparatus 10 has a pair of LED indicators 16 and 17 that are ON when the apparatus 10 obtains and maintains a wireless connection to the LAN (local area network) and OFF when the apparatus 10 does not have a wireless connection to the LAN. The LED indicators 16 and 17 also preferably represent the state of the outlet power for the apparatus 10 as well, which is preferably accomplished by blinking in a set pattern. Alternatively, the LED indicators 16 and 17 flashes accordingly to indicate the status of the wireless connection.

Figure 26:
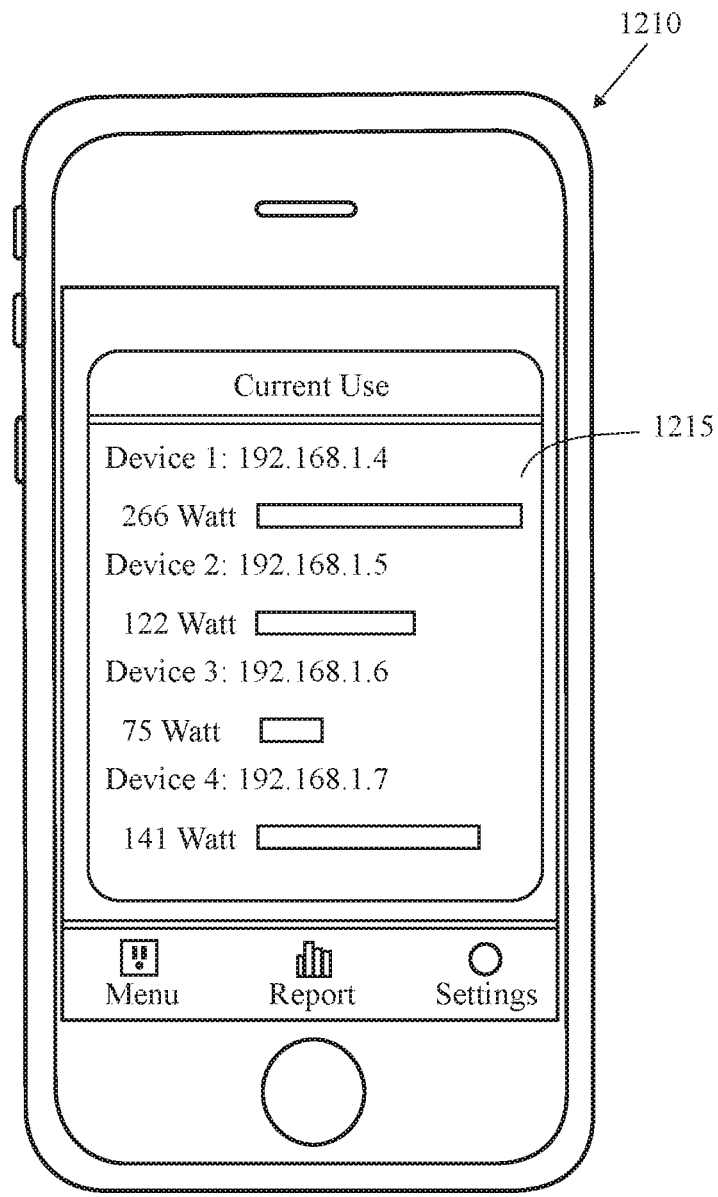
FIG. 26 is a screen view of a status chart of a system for controlling power to an electrically powered device.

FIG. 26 is a screen view of an IPHONE mobile device 1210 being used as a controller of a system for controlling power to an electrically powered device. The screen 1215 shows the devices in current use and the wattage used at the current time. For example, Device 1 could be a laptop being used.

Figure 27:
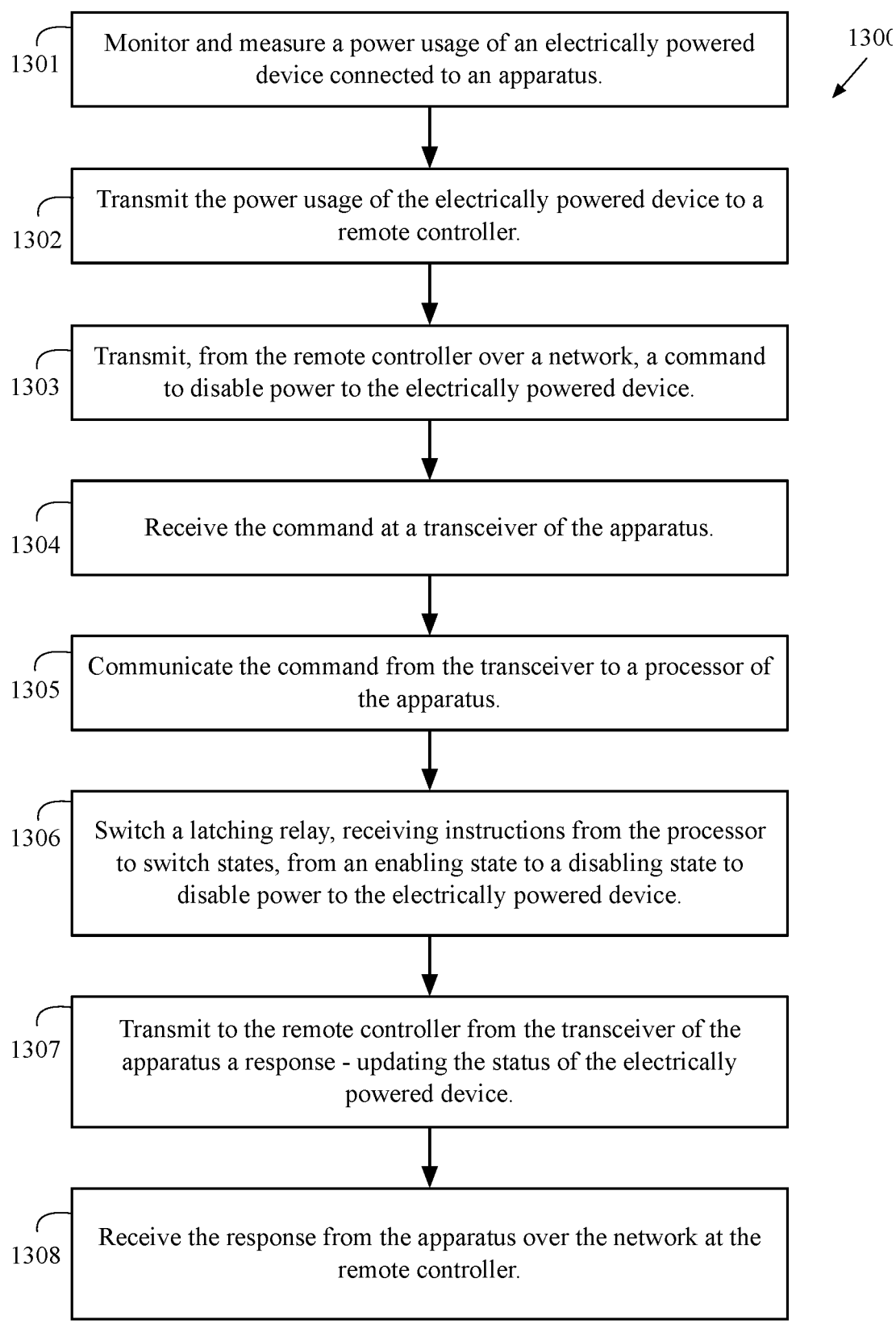
FIG. 27 is a flow chart of control logic for a method for monitoring and controlling electrical power to an electrically powered device.

FIG. 27 is a flowchart for a method 1300 of the present invention. At block 1301, power usage of an electrically powered device connected to an apparatus is monitored and measured. At block 1302, power usage of the electrically powered device is transmitted to a remote controller. At block 1303, a command to disable power to the electrically powered device is transmitted over a network from a remote controller. Then at block 1304, the transceiver of the apparatus receives the command. The command is then communicated from the transceiver to the processor of the apparatus at block 1305. At block 1306, a electro-mechanical relay is switched from an enabling state to a disabling state to disable power to the electrically powered device after receiving instructions from the processor. Then at block 1307, the transceiver of the apparatus transmits a response to the remote controller, over the network, updating the status of the electrically powered device. At block 1308, the remote controller receives the response from the apparatus over the network.

Figure 28:
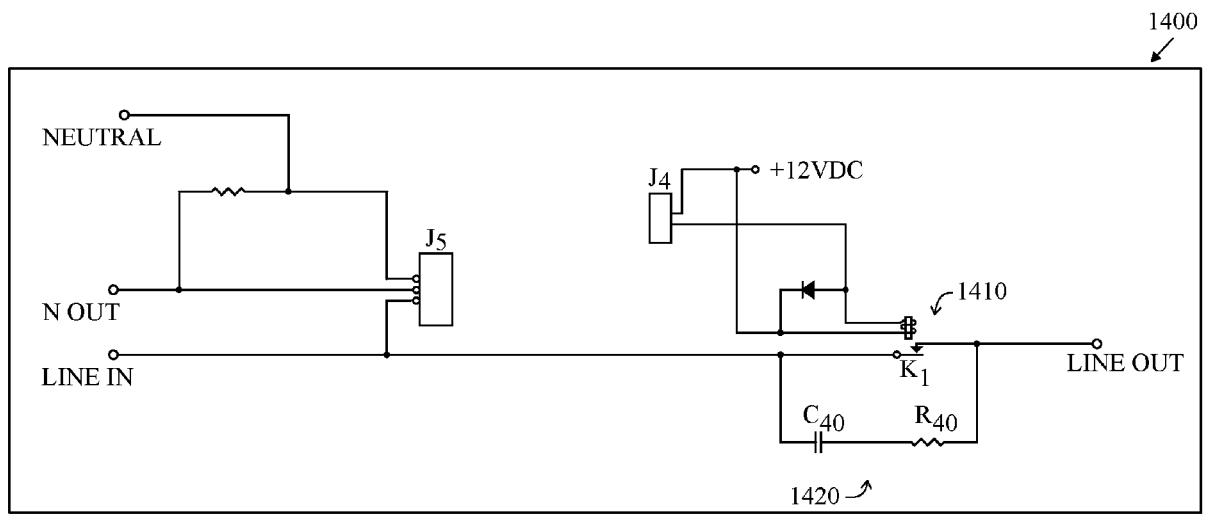
FIG. 28 is a circuit diagram of an electro-mechanical relay utilized with the system for controlling power to an electrically powered device.

FIG. 28 is a circuit diagram of an electro-mechanical relay utilized with the invention. One preferred electro-mechanical relay is a 20A power relay from NAIS.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim:

1. A system for monitoring and controlling electrical power to an electrically-powered device, the system comprising:
an apparatus comprising:
a housing,
an electro-mechanical relay,
a processor, and
a wireless transceiver configured for communication over a WiFi network using a WiFi communication format,
wherein the apparatus is a junction box;
an electrically-powered device, the device is hard wired to the apparatus; and
a remote controller for wirelessly transmitting a plurality of commands to the apparatus over the WiFi network;
wherein the processor of the apparatus is configured to monitor and measure a power usage of the electrically powered device;
wherein the processor of the apparatus is configured to transmit through the wireless transceiver the power usage of the electrically powered device to the remote controller over the WiFi network;
wherein the processor of the apparatus is configured to receive a command from the remote controller directly over the WiFi network, the command to disable power to the electrically powered device;
wherein the processor of the apparatus is configured to switch the electro-mechanical relay from an enabling state to a disabling state to disable power to the electrically powered device;
wherein the processor of the apparatus is configured to wirelessly transmit over the WiFi network a response to the controller updating the status of the electrically powered device; and
wherein the remote controller is configured to receive the response from the apparatus over the WiFi network.

2. The system according to claim 1 wherein the remote controller is a smartphone, a computer, or a mobile phone.

3. The system according to claim 1 wherein the system utilizes an 802.11 communication format.

4. The system according to claim 1 wherein the electrically-powered device is one of a vending machine, a computer, a monitor, a television, a printer, a lamp or a radio.

5. An apparatus for monitoring and controlling electrical power to an electrically-powered device, the apparatus comprising:
a housing;
a junction box hard wired to an electrically-powered device;
an alternating current input plug for connection to an outlet to receive power;
an electro-mechanical relay electrically positioned between the alternating current input plug and the at least one alternating current outlet socket;
a plurality of LED indicators;
a processor; and
a wireless transceiver for communication over a WiFi network using a WiFi communication format;
wherein the plurality of LED indicators are on when the apparatus is connected to the WiFi network and off when apparatus does not have a connection to the WiFi network;
wherein the processor of the apparatus is configured to monitor and measure a power usage of the electrically powered device connected to an apparatus;
wherein the processor of the apparatus is configured to wirelessly transmit through the wireless transceiver over the WiFi network the power usage of the electrically powered device to the controller;
wherein the processor of the apparatus is configured to receive a command wirelessly transmitted over the WiFi network to disable power to the electrically powered device;
wherein the processor of the apparatus is configured to switch the electro-mechanical relay from an enabling state to a disabling state to disable power to the electrically powered device;
wherein the electro-mechanical relay is configured to switch from an enabling state to a disabling state; and
wherein the processor of the apparatus is configured to wirelessly transmit over the WiFi network a status of the electrically powered device.

6. A method for monitoring and controlling electrical power to an electrically-powered device, the method comprising:
monitoring and measuring a power usage of an electrically powered device connected to an apparatus, wherein the apparatus is a junction box, wherein the electrically powered device is hard wired to the apparatus;
transmitting, wirelessly, the power usage of the electrically powered device to a remote controller directly over a WiFi network;
transmitting, wirelessly, a command from the remote controller over the WiFi network, the command to disable power to the electrically powered device;
receiving the command at a wireless transceiver of the apparatus;
communicating the command from the transceiver to a processor of the apparatus;
switching a power relay from an enabling state to a disabling state to disable power to the electrically powered device, the power relay receiving instructions from the processor to switch from an enabling state to a disabling state;
transmitting, wirelessly over the WiFi network, a response to the remote controller from the transceiver of the apparatus, the response updating the status of the electrically powered device; and
receiving wirelessly over the WiFi network, the response from the apparatus over the network at the remote controller.

7. The method according to claim 6 wherein the remote controller is a smartphone.

8. The method according to claim 6 wherein the remote controller is a personal computer.

9. The method according to claim 6 wherein the network is the Internet.

10. The method according to claim 6 further comprising storing the power usage data by one of hour, day, week, month and year.

11. The method according to claim 6 wherein the system utilizes an 802.11 communication format.

12. The method according to claim 6 wherein the electrically-powered device is one of a vending machine, a computer, a monitor, a television, a printer, a lamp and a radio.

13. The method according to claim 6 wherein the command is automatically sent at a predetermined time of day.

14. The method according to claim 6 wherein the command is automatically sent in response to a request to load change demand.

* * * * *